US012803477B2

(12) United States Patent
Sakai et al.

(10) Patent No.: US 12,803,477 B2
(45) Date of Patent: Nov. 17, 2026

(54) STEPPING MOTOR CONTROL CIRCUIT AND ANALOG ELECTRONIC TIMEPIECE

(71) Applicant: SEIKO WATCH KABUSHIKI KAISHA, Tokyo (JP)

(72) Inventors: Satoshi Sakai, Chiba (JP); Kosuke Yamamoto, Chiba (JP)

(73) Assignee: SEIKO WATCH KABUSHIKI KAISHA, Tokyo (JP)

( * ) Notice: Subject to any disclaimer, the term of this patent is extended or adjusted under 35 U.S.C. 154(b) by 184 days.

(21) Appl. No.: 18/914,561

(22) Filed: Oct. 14, 2024

(65) Prior Publication Data

US 2025/0125750 A1 Apr. 17, 2025

(30) Foreign Application Priority Data

Oct. 16, 2023 (JP) ................................ 2023-178127

(51) Int. Cl.
*H02P 8/18* (2006.01)
*G04C 3/14* (2006.01)
*H02P 8/02* (2006.01)

(52) U.S. Cl.
CPC . *H02P 8/02* (2013.01); *G04C 3/14* (2013.01)

(58) Field of Classification Search
CPC .... H02P 8/02; H02P 8/18; G04C 3/14; G04C 3/143
See application file for complete search history.

(56) References Cited

U.S. PATENT DOCUMENTS

2020/0225621 A1* 7/2020 Sakai ........................ H02P 8/18
2021/0149344 A1* 5/2021 Saito ...................... G04B 19/02
2022/0075324 A1* 3/2022 Nagahama ............... G04C 3/14

FOREIGN PATENT DOCUMENTS

JP 5363167 B 9/2013

* cited by examiner

*Primary Examiner* — Muhammad S Islam
(74) *Attorney, Agent, or Firm* — Crowell & Moring LLP

(57) ABSTRACT

A drive range can be expanded even when the number of selectable ranks of main drive pulses is limited. A stepping motor control circuit includes: a rotation detection unit configured to detect, in a detection section for detecting a detection signal generated by rotation of a stepping motor, a rotation state of the stepping motor based on whether the detection signal exceeds a predetermined reference threshold voltage in a predetermined detection section; and a control unit configured to drive and control the stepping motor with any one of a plurality of main drive pulses having different energies according to a detection result obtained by the rotation detection unit, in which the control unit selects a plurality of main drive pulses such that a difference in energy between a plurality of main drive pulses in main drive pulses having a predetermined first energy or more is larger than a difference in energy between a plurality of main drive pulses in main drive pulses having an energy less than the first energy.

6 Claims, 7 Drawing Sheets

| ROTATION DETECTION | | | | RANK OPERATION | | |
|---|---|---|---|---|---|---|
| T1 | T2 | T3 | DETERMINATION | DECISION | P1 | P2 |
| 0 | 1 | 1/0 | ROTATION WITH RESERVED CAPACITY | DOWN | -1 or -2 RANK | NO |
| 1 | 1 | 1/0 | ROTATION WITHOUT RESERVED CAPACITY | MAINTAINED | 0 | NO |
| 1/0 | 0 | 1 | ROTATION WITH LEAST ENERGY | UP | +1 or +2 RANK | NO |
| 1/0 | 0 | 0 | NON-ROTATION | P2 + UP | +1 or +2 RANK | YES |

STEPPING MOTOR CONTROL CIRCUIT AND ANALOG ELECTRONIC TIMEPIECE

RELATED APPLICATIONS

This application claims priority to Japanese Patent application No. JP2023-178127 filed on Oct. 16, 2023, the entire content of which is incorporated herein by reference.

BACKGROUND OF THE INVENTION

1. Field of the Invention

The present invention relates to a stepping motor control circuit and an analog electronic timepiece.

2. Description of Related Art

In the related art, a stepping motor has a stator having a rotor accommodating hole and a position determination portion for determining a stop position of a rotor, the rotor disposed in the rotor accommodating hole, and a coil, and is used in an analog electronic timepiece, or the like, in which an alternating signal is supplied to the coil to generate a magnetic flux in the stator to rotate the rotor and the rotor is stopped at a position corresponding to the position determination portion.

As a control circuit for controlling the stepping motor, for example, a stepping motor control circuit described in PTL 1 is known. The stepping motor control circuit described in PTL 1 determines a rotation state based on an output timing of a detection signal after outputting a main drive pulse. The stepping motor control circuit described in PTL 1 determines whether to output a corrective drive pulse, and to move a rank of the main drive pulse downward, maintain the rank of the main drive pulse, or move the rank of the main drive pulse upward by determining the rotation state.

3. Citations

Patent Literature

PTL 1: JP5363167B

SUMMARY OF THE INVENTION

However, in the stepping motor control circuit described in PTL 1, there is a case where the number of selectable ranks of main drive pulses is limited due to limitations on a specification of a control circuit, and a drive range is limited.

The invention has been made in view of the above points, and provides a stepping motor control circuit and an analog electronic timepiece capable of expanding a drive range even when the number of selectable ranks of main drive pulses is limited.

The invention has been made to solve the above problems. According to one aspect of the invention, a stepping motor control circuit includes: a rotation detection unit configured to detect, in a detection section for detecting a detection signal generated by rotation of a stepping motor, a rotation state of the stepping motor based on whether the detection signal exceeds a predetermined reference threshold voltage in a predetermined detection section; and a control unit configured to drive and control the stepping motor with any one of a plurality of main drive pulses having different energies according to a detection result obtained by the rotation detection unit, in which the control unit selects a plurality of main drive pulses such that a difference in energy between a plurality of main drive pulses in main drive pulses having a predetermined first energy or more is larger than a difference in energy between a plurality of main drive pulses in main drive pulses having an energy less than the first energy.

According to one aspect of the invention, in the above stepping motor control circuit, the first energy is an energy of a main drive pulse that continues to act after a magnetic pole of a rotor passes a point where a magnetic potential of a stator is maximized and acts to attract the rotor to an end of a second quadrant.

According to one aspect of the invention, in the above stepping motor control circuit, the first energy is an energy at which a main drive pulse having the first energy or more has a total length of 3.5 ms or more and 5.0 ms or less.

According to one aspect of the invention, in the above stepping motor control circuit, the control unit changes the main drive pulse to a main drive pulse having a small energy when the control unit determines that rotation is rotation with reserved capacity in which the main drive pulse has a drive energy having a reserved capacity.

According to one aspect of the invention, in the above stepping motor control circuit, the control unit divides the detection section, which starts immediately after drive with the main drive pulse, into a plurality of sections, which are three or more sections, and controls the main drive pulse according to a section in which the rotation detection unit detects a detection signal exceeding the reference threshold voltage.

According to one aspect of the invention, in an analog electronic timepiece including a stepping motor configured to rotationally drive a time hand and a stepping motor control circuit configured to control the stepping motor, the stepping motor control circuit is the stepping motor control circuit according to any one of above-described aspects.

According to the invention, a drive range can be expanded even when the number of selectable ranks of main drive pulses is limited.

DETAILED DESCRIPTION OF THE PREFERRED EMBODIMENTS

Embodiment

Figure 1:
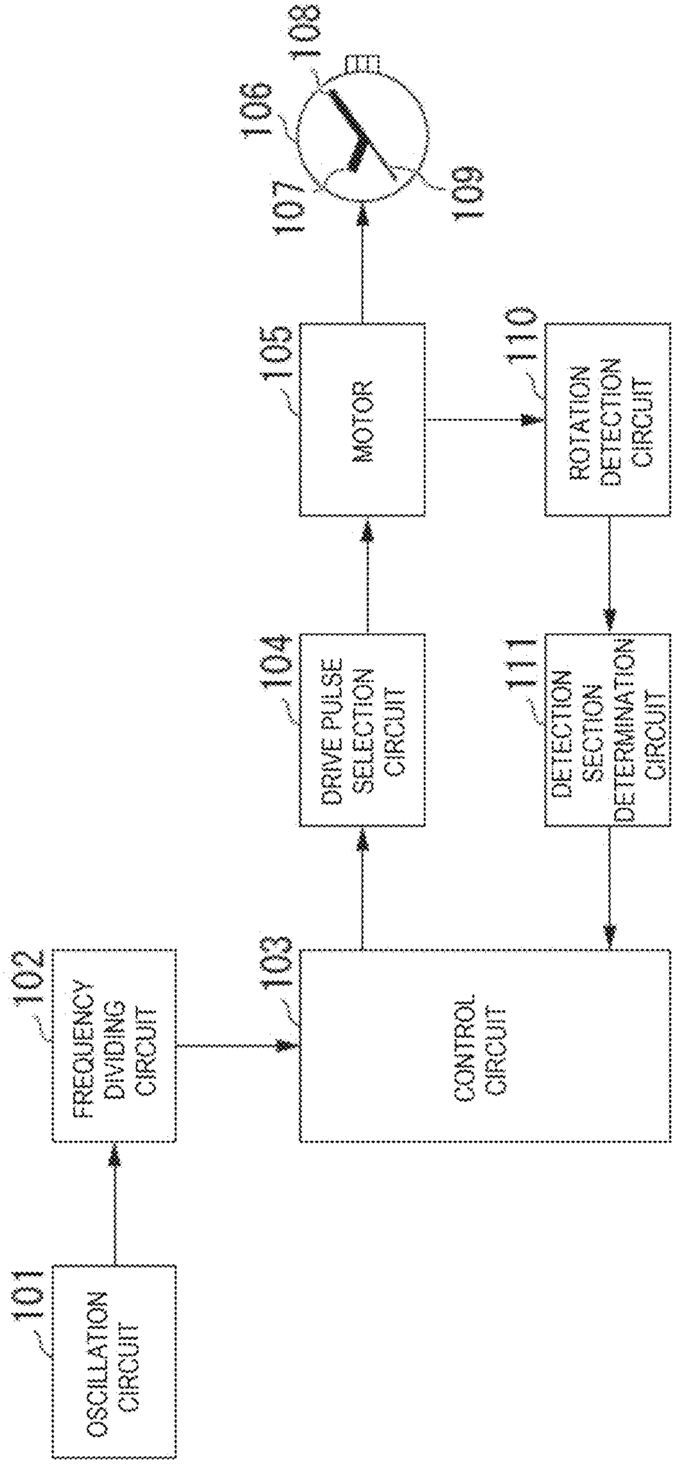
FIG. 1 is a diagram showing an example of a configuration of an analog electronic timepiece using a stepping motor control circuit according to an embodiment of the invention.

Hereinafter, an embodiment of the invention will be described with reference to drawings. FIG. 1 is a diagram showing an example of a configuration of an analog electronic timepiece using a stepping motor control circuit according to the present embodiment. The analog electronic timepiece is, for example, an analog electronic wristwatch.

In FIG. 1, the analog electronic timepiece includes an oscillation circuit 101, a frequency dividing circuit 102, a control circuit 103, a drive pulse selection circuit 104, a stepping motor 105, an analog display unit 106, a rotation detection circuit 110, and a detection section determination circuit 111.

The oscillation circuit 101 generates a signal having a predetermined frequency.

The frequency dividing circuit 102 divides a frequency of the signal generated by the oscillation circuit 101 and generates a timepiece signal that serves as a reference for timekeeping.

The control circuit 103 controls electronic circuit elements constituting the electronic timepiece and controls a change in a drive pulse.

The drive pulse selection circuit 104 selects and outputs a drive pulse for driving rotation of a motor based on a control signal from the control circuit 103.

The stepping motor 105 is rotationally driven with a drive pulse from the drive pulse selection circuit 104.

The analog display unit 106 includes time hands (three types, which are an hour hand 107, a minute hand 108, and a second hand 109 in the example in FIG. 1) for displaying time by being driven to rotate by the stepping motor 105.

The rotation detection circuit 110 detects a detection signal (also referred to as an induced signal) VRs indicating a rotation state from the stepping motor 105 in a predetermined detection section.

The detection section determination circuit 111 compares a time at which the rotation detection circuit 110 detects the detection signal VRs exceeding a predetermined reference threshold voltage Vcomp with a detected section, and determines which section the detection signal VRs is detected. As to be described later, in the present embodiment, a detection section for detecting a rotation state of the stepping motor 105 is divided into three sections.

The rotation detection circuit 110 detects the detection signal VRs exceeding the predetermined reference threshold voltage Vcomp. The detection signal VRs exceeds the reference threshold voltage Vcomp when a rotor of the stepping motor 105 performs a constant fast operation. The reference threshold voltage Vcomp is set so that the detection signal VRs does not exceed the reference threshold voltage Vcomp when the rotor of the stepping motor 105 does not perform a constant fast operation. The case where the rotor performs a constant fast operation is, for example, a case where the stepping motor 105 rotates. The case where the rotor does not perform a constant fast operation is, for example, a case where the stepping motor 105 does not rotate. In other words, the reference threshold voltage Vcomp is a reference for determining a voltage level of the detection signal VRs, which corresponds to an induced voltage generated by free oscillations of the stepping motor 105.

A configuration of the rotation detection circuit 110 is similar as a configuration of the rotation detection circuit described in PTL 1, for example.

As described above, the rotation detection circuit 110 detects the rotation state of the stepping motor 105 based on whether the detection signal VRs generated by rotation of the stepping motor 105 exceeds a predetermined reference threshold voltage within one or more of a first section T1, a second section T2, and a third section T3 in the detection section in which the detection signal VRs is detected. The rotation detection circuit 110 is an example of a rotation detection unit.

The control circuit 103 drives and controls the stepping motor 105 with any one of a plurality of main drive pulses P1 having different energies according to a detection result of the rotation detection circuit 110. The control circuit 103, the drive pulse selection circuit 104, and the detection section determination circuit 111 constitute an example of a control unit.

Figure 2:
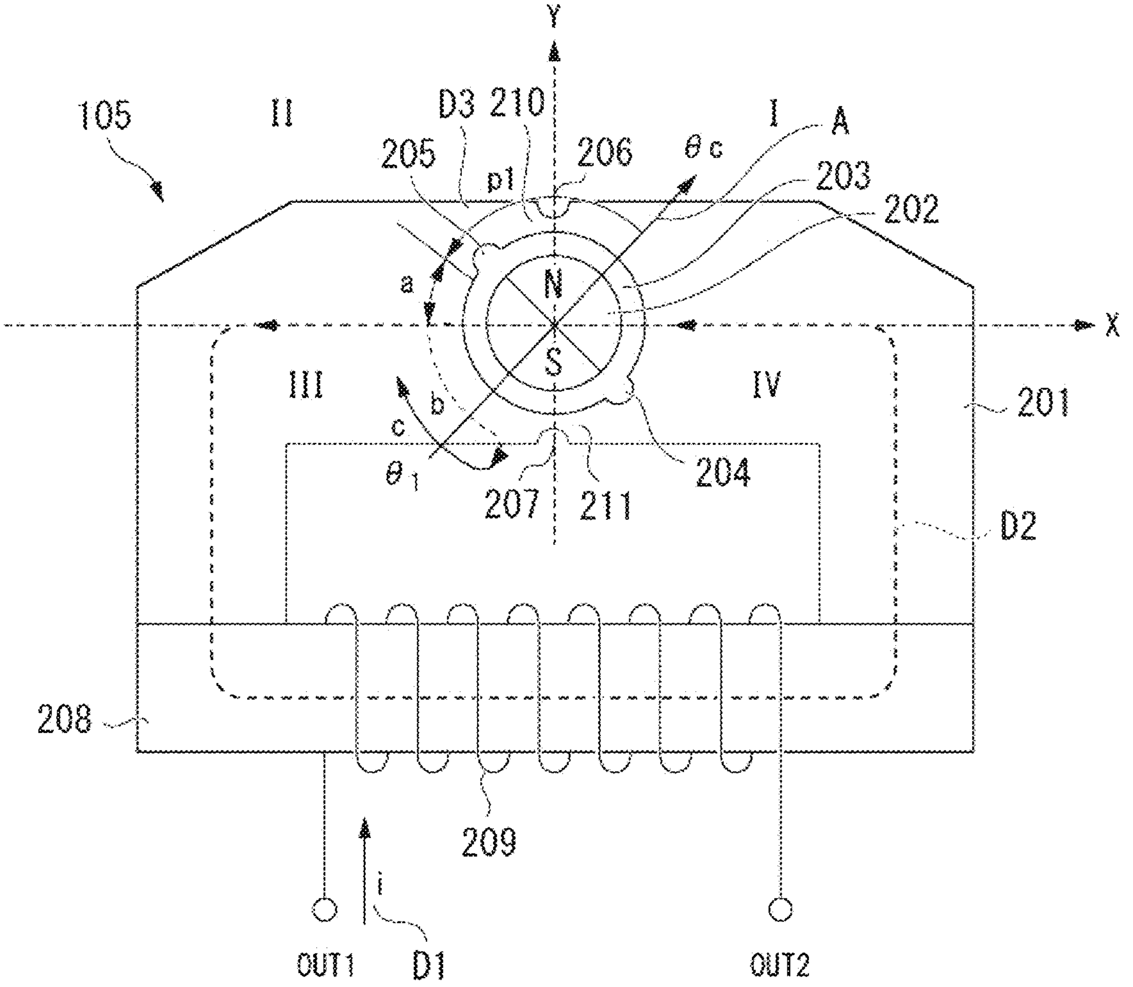
FIG. 2 is a diagram showing an example of a configuration of a stepping motor according to the embodiment of the invention.

FIG. 2 is a diagram showing an example of a configuration of a stepping motor according to the present embodiment. The stepping motor is, for example, a timepiece stepping motor that is generally used in an analog electronic timepiece.

In FIG. 2, the stepping motor 105 includes a stator 201, a rotor 202, a magnetic core 208, and a coil 209. The stator 201 has a rotor accommodating through hole 203. The rotor 202 is rotatably disposed in the rotor accommodating through hole 203. The magnetic core 208 is joined to the stator 201. The coil 209 is wound around the magnetic core 208.

When the stepping motor 105 is used in the analog electronic timepiece, the stator 201 and the magnetic core 208 are fixed to a main plate (not shown) by screws (not shown), and are joined to each other. The coil 209 has a first terminal OUT1 and a second terminal OUT2.

The rotor 202 is magnetized to two poles (S pole and N pole). At an outer end portion of the stator 201 formed by a magnetic material, a plurality of (two in the present embodiment) cutout portions (also referred to as outer notches) 206 and 207 are provided at positions facing each other with the rotor accommodating through hole 203 interposed therebetween. A saturable portion 210 is provided between the cutout portion 206 and the rotor accommodating through hole 203. A saturable portion 211 is provided between the cutout portion 207 and the rotor accommodating through hole 203.

Each of the saturable portion 210 and the saturable portion 211 is configured so as not to be magnetically saturated by a magnetic flux of the rotor 202, but to be magnetically saturated and have large magnetic resistance when the coil 209 is excited. The rotor accommodating through hole 203 is formed in a circular hole shape in which a plurality of (two in the present embodiment) half-moon shaped cutout portions (also referred to as inner notches) 204 and 205 are integrally formed in facing portions of a through hole having a circular contour.

The cutout portion 204 and the cutout portion 205 constitute a position determination portion for determining a stop position of the rotor 202. When the coil 209 is not excited, the rotor 202 is stably stopped at a position corresponding to the position determination portion as shown in FIG. 2. In other words, when the coil 209 is not excited, the rotor 202 is stably stopped at a position (angle θ0 position)

where a magnetic pole axis A of the rotor 202 is perpendicular to a line segment connecting the cutout portion 204 and the cutout portion 205.

As shown in FIG. 2, an XY coordinate space centered on a rotation axis (rotation center) of the rotor 202 is divided into four quadrants (first quadrant I, second quadrant II, third quadrant III, and fourth quadrant IV).

Here, when a rectangular wave drive pulse of one polarity is supplied from the drive pulse selection circuit 104 between the first terminal OUT1 and the second terminal OUT2 of the coil 209 (for example, the first terminal OUT1 side is a positive electrode, the second terminal OUT2 side is a negative electrode), and a current i flows in a direction indicated by an arrow D1 in FIG. 2, a magnetic flux is generated in the stator 201 in a direction indicated by a broken line arrow D2. Accordingly, the saturable portion 210 and the saturable portion 211 are saturated and magnetic resistance increases. Thereafter, by interaction between a magnetic pole of the stator 201 and a magnetic pole of the rotor 202, the rotor 202 rotates by 180 degrees in a direction indicated by an arrow D3 in FIG. 2, and the magnetic pole axis A is stably stopped at a position of an angle θ1.

A rotation direction (counterclockwise direction in FIG. 2) for performing a normal operation by rotationally driving the stepping motor 105 is a forward direction, and an opposite direction (clockwise direction) is a reverse direction. In the present embodiment, the normal operation is an operation of moving hands since a timepiece is an analog electronic timepiece.

Next, the drive pulse selection circuit 104 supplies a rectangular wave drive pulse of an opposite polarity to the first terminal OUT1 and the second terminal OUT2 of the coil 209. Here, the first terminal OUT1 side is set to a negative electrode and the second terminal OUT2 side is set to a positive electrode so as to have a polarity opposite to that of the above-described drive. When a current flows in a direction opposite to the direction indicated by the arrow D1 in FIG. 2 by supplying a drive pulse to the first terminal OUT1 and the second terminal OUT2, a magnetic flux is generated in the stator 201 in a direction opposite to the direction indicated by the broken line arrow D2. Accordingly, the saturable portion 210 and the saturable portion 211 are first saturated. Thereafter, by interaction between the magnetic pole of the stator 201 and the magnetic pole of the rotor 202, the rotor 202 rotates by 180 degrees in the same direction as the direction indicated by the arrow D3, and the magnetic pole axis A is stably stopped at the position of the angle θ0.

Thereafter, by supplying signals (alternating signals) having different polarities to the coil 209 thus, the above-described operation is repeatedly performed, and the rotor 202 can be continuously rotated in the direction of the arrow by 180 degrees at a time. As to be described later, in the present embodiment, a plurality of main drive pulses P10 to P1*m* and a corrective drive pulse P2 are used as drive pulses. The plurality of main drive pulses P10 to P1*m* and the corrective drive pulse P2 have different energies.

Figure 3:
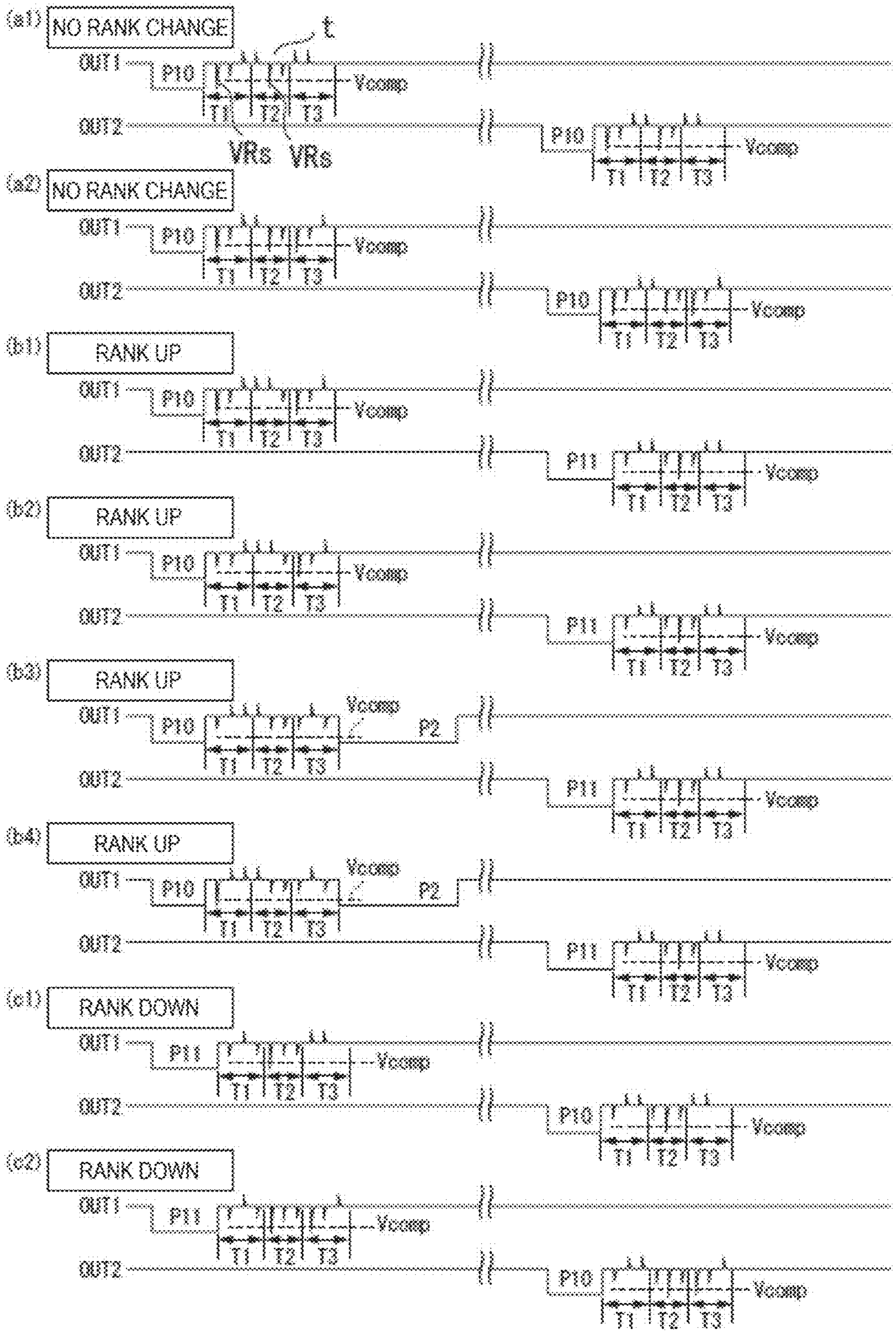
FIG. 3 is a timing chart for showing an example of operations of the stepping motor control circuit and the analog electronic timepiece according to the embodiment of the invention.

FIG. 3 is a timing chart for showing an example of operations of the stepping motor control circuit and the analog electronic timepiece according to the present embodiment. FIG. 3 shows an example in which the stepping motor 105 is driven with a main drive pulse P1*n* having a rank n and the corrective drive pulse P2. In FIG. 3, the main drive pulse P1*n* is characterized by the rank n. The rank n is an integer having a value in a range from a minimum value 0 to a maximum value m. The main drive pulse P1*n* is configured such that the larger a value of the rank n, the larger an energy of the pulse. A large pulse energy corresponds to a long pulse width of the rectangular wave in the present embodiment.

The corrective drive pulse P2 is a pulse having a large energy enough to drive an excessive load to rotate. The energy of the corrective drive pulse P2 is configured to be 10 times larger than that of the main drive pulse P1. That is, the main drive pulse P10, the main drive pulse P1*n*, the main drive pulse P1*m*, and the corrective drive pulse P2 are configured such that pulse widths are P10<P1*n*<P1*m*<P2. Here, n is an integer of 1 to m−1.

As described above, the reference threshold voltage Vcomp is a reference for determining a voltage level of the detection signal VRs, which corresponds to an induced voltage generated by free oscillations of the stepping motor 105. t is a time when the detection signal VRs exceeding the reference threshold voltage Vcomp is detected.

The first section T1 is a predetermined time immediately after the drive with the main drive pulse P1. The second section T2 is a predetermined time after the first section T1. The third section T3 is a predetermined time after the second section. Thus, an entire detection section T, which starts immediately after the drive with the main drive pulse P1, is divided into a plurality of sections. The rotation state is detected based on detection signals having the same polarity in the first section T1, the second section T2, and the third section T3.

The expression "immediately after the drive with the main drive pulse P1" refers to immediately at a time point when it becomes practically possible to detect rotation. "Immediately after the drive with the main drive pulse P1" means a time point at which the rotation can be detected after a predetermined time elapses in a sampling cycle in which sampling processing for detecting the rotation is not possible after the driving with the main drive pulse P1 is ended, or a time point after a predetermined time elapses at which an induced voltage generated by an end of driving with the main drive pulse P1 itself affects the rotation detection.

As to be described in detail later, in the stepping motor control circuit according to the present embodiment, when an area driven with a drive pulse is p1 in a load state shown in FIG. 2, the detection signal VRs corresponding to an induced voltage generated in an area a is detected in the first section T1. The detection signal VRs generated in an area c is detected in the second section T2 and the third section T3. Here, a reserved capacity of a drive energy detected in the second section T2 is larger than that detected in the third section T3. The detection signal VRs generated in an area b is detected with an opposite polarity across the first section T1 and the second section T2.

That is, since the detection signal VRs is generated by free oscillations of the rotor 202 after the drive pulse is cut off, the detection signal VRs induced in the first section T1 is characterized by being generated to a timing limited to an area from rotational drive without a reserved capacity (almost stopped) to an area having a certain degree of reserved drive capacity, and not being generated when there is a sufficient rotational force. The area a in FIG. 2 corresponds to an area from rotational drive without a reserved capacity to an area having a certain degree of reserved drive capacity.

When the reserved drive capacity is sufficient, the drive pulse is cut off in the area b, and thus the induced voltage is output in an opposite phase. Due to motion of the rotor, a height of the detection signal VRs in the first section T1 is inversely proportional to a reduction in the reserved drive capacity. A degree of reserved capacity of the drive energy can be determined using such a property.

In the present embodiment, such a property is considered, the above-described detection section that starts immediately after the drive with the main drive pulse P1 is divided into a plurality of sections, which are three or more sections, and the main drive pulse P1 is controlled according to a section in which the rotation detection circuit 110 detects the detection signal VRs exceeding the reference threshold voltage Vcomp. For example, when the detection signal VRs exceeding the reference threshold voltage Vcomp is generated in the first section T1, it is determined that the reserved rotation capacity decreases, and an energy of the drive pulse is maintained without being changed from a current value, so that the drive pulse having a small energy is not changed.

In the stepping motor control circuit according to the present embodiment, as shown in (a1) in FIG. 3, when the detection signal VRs exceeding the reference threshold voltage Vcomp is detected at least in the first section T1 and the second section T2, the main drive pulse P1 is not changed (no rank change). As shown in (a2) in FIG. 3, the main drive pulse P1 is also not changed even when the detection is performed in all the first section T1, the second section T2, and the third section T3. As shown in (a1) and (a2) in FIG. 3, when it is determined that the main drive pulse P1 is a drive energy without reserved capacity (rotation without reserved capacity), the main drive pulse P1 is maintained without being changed.

In the stepping motor control circuit according to the present embodiment, as shown in (b1) in FIG. 3, when the detection signal VRs exceeding the reference threshold voltage Vcomp is detected only in the first section T1 and the third section T3, the main drive pulse P1 is changed to a main drive pulse P1 having a large energy (rank up) without performing driving with the corrective drive pulse P2. As shown in (b2) in FIG. 3, when the the detection is performed only in the third section, the main drive pulse P1 is also changed to a main drive pulse P1 having a large energy (rank up) without performing driving with the corrective drive pulse P2. As shown in (b1) and (b2) in FIG. 3, when it is determined that the main drive pulse P1 is a minimum (least) drive energy required to rotate the motor (rotation with least energy), the main drive pulse is changed to a main drive pulse having a large energy.

In the stepping motor control circuit according to the present embodiment, as shown in (c1) in FIG. 3, when the detection signal VRs exceeding the reference threshold voltage Vcomp is detected only in the second section T2, the main drive pulse P1 is changed to a main drive pulse P1 having a small energy (rank down). As shown in (c2) in FIG. 3, when the the detection is performed only in the second section and the third section, the main drive pulse P1 is also changed to a main drive pulse P1 having a small energy (rank down). As shown in (c1) and (c2) in FIG. 3, when it is determined that the main drive pulse P1 has a drive energy having a reserved capacity (rotation with reserved capacity), the main drive pulse P1 is changed to a main drive pulse having a small energy.

Therefore, when it is determined that the rotation is rotation with reserved capacity in which the main drive pulse P1 has a drive energy having a reserved capacity, the control circuit 103 changes the main drive pulse P1 to a main drive pulse having a small energy.

In the stepping motor control circuit according to the present embodiment, as shown in (b3) in FIG. 3, when the detection signal VRs exceeding the reference threshold voltage Vcomp is not detected in any of the first section T1 to the third section T3, the main drive pulse P1 is changed to a main drive pulse P1 having a large energy (rank up) after performing driving with the corrective drive pulse P2. As shown in (b4) in FIG. 3, when the detection is performed only in the first section T1, it is determined that the rotation is not performed, and after performing driving with the corrective drive pulse P2, the main drive pulse P1 is changed to a main drive pulse P1 having a large energy (rank up).

Figure 4:
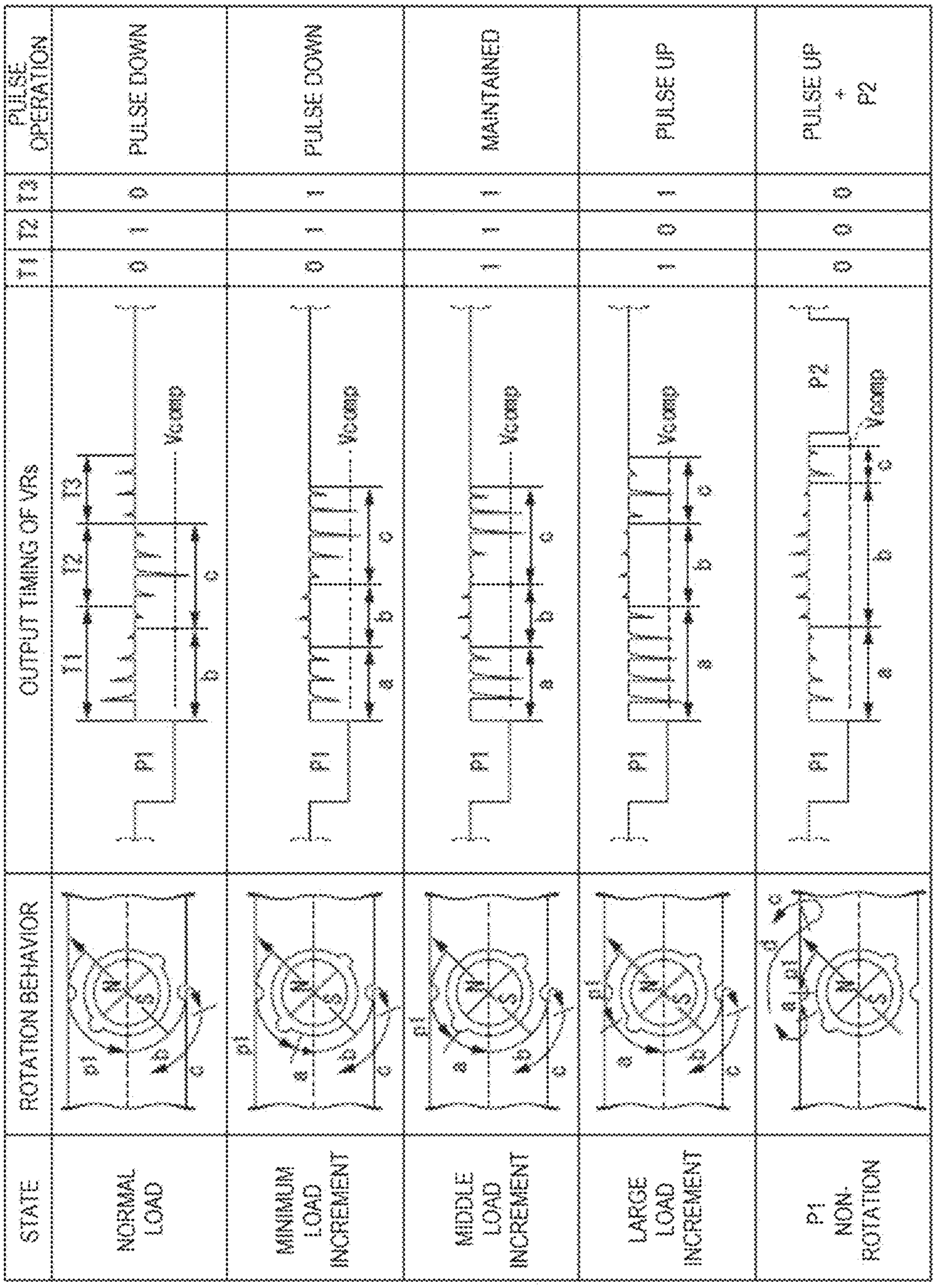
FIG. 4 is a timing chart showing an example of an operation of the stepping motor control circuit according to the embodiment of the invention.

FIG. 4 is a timing chart showing an example of an operation of the stepping motor control circuit according to the present embodiment. FIG. 4 shows a rotation behavior of the rotor 202, an output timing of the detection signal VRs, a pattern (determination value indicating a detection result of the detection signal VRs in each section) indicating a rotation state, and a pulse control operation for each load state when the stepping motor 105 is driven with the main drive pulse P1.

In FIG. 4, p1 represents a section in which the rotor 202 of the stepping motor 105 is rotationally driven with the main drive pulse P1. a to e are areas each representing a rotational position of the rotor 202 due to free oscillations after the driving with the main drive pulse P1 is stopped.

When the XY coordinate space where the magnetic pole axis A of the rotor 202 is positioned by rotation of the rotor 202 around the rotor 202 is divided into the first quadrant I, the second quadrant II, the third quadrant III, and the fourth quadrant IV (see FIG. 2), the first section T1 to the third section T3 can be represented as follows.

That is, in a normal load state, the first section T1 is a section for determining an initial forward rotation state of the rotor 202 in the third quadrant III of a space around the rotor 202 and a section for determining a first reverse rotation state. In the normal load state, the second section T2 is a section for determining an initial reverse rotation state of the rotor 202 in the third quadrant III. In the normal load state, the third section T3 is a section for determining a rotation state after the first reverse rotation of the rotor 202 in the third quadrant III. Here, the normal load means a load that is driven under normal circumstances. In the present embodiment, a load when the time hands are driven is a normal load.

As described above, the reference threshold voltage Vcomp is a reference threshold voltage for determining the voltage level of the detection signal VRs generated by the stepping motor 105. The reference threshold voltage Vcomp is set so that the detection signal VRs exceeds the reference threshold voltage Vcomp when the rotor 202 performs a constant fast operation such as when the stepping motor 105 rotates, and so that the detection signal VRs does not exceed the reference threshold voltage Vcomp when the rotor 202 does not perform a constant fast operation, such as when not rotating.

When an area to be driven with the drive pulse is p1, a detection signal corresponding to an induced voltage generated in the area a is detected in the first section T1. The detection signal VRs generated in the area c is detected in any one of the first section T1, the second section T2, and the third section T3 according to a load state. Here, a reserved capacity of a drive energy detected in the second section T2 is larger than that detected in the third section T3. The detection signal VRs generated in the area b is detected in the first section T1 or in the second section T2 in an opposite polarity according to a load state.

Since the detection signal VRs is generated by free oscillations of the rotor 202 after the drive pulse is cut off, the detection signal VRs induced in the first section T1 is characterized by being generated to a timing limited to an area from rotational drive without a reserved capacity (almost stopped) to an area having a certain degree of reserved drive capacity, and not being generated when there is a sufficient rotational force. In view of such characteristics, in the present embodiment, a load is determined and drive pulse control is executed based on a pattern of the detection signal VRs detected in the first section T1 to the third section T3.

For example, in FIG. 4, in the stepping motor control circuit according to the present embodiment, the detection signal VRs generated in the area b is detected in the first section T1 in the normal load state. The detection signal VRs generated in the area c is detected in the first section T1 and the second section T2. The detection signal VRs generated after the area c is detected in the third section T3.

Here, a case in which the rotation detection circuit 110 detects the detection signal VRs exceeding the reference threshold voltage Vcomp is referred to as a determination value "1", and a case in which the rotation detection circuit 110 cannot detect the detection signal VRs exceeding the reference threshold voltage Vcomp is referred to as a determination value "0". In the case of the normal load in FIG. 4, the detection section determination circuit 111 detects a pattern (0, 1, 0) representing a rotation state (a determination value of the first section, a determination value of the second section, and a determination value of the third section). In the case of the normal load, the control circuit 103 determines that a drive energy is excessively large (rotation with reserved capacity), and executes pulse control so as to move a drive energy rank of the main drive pulse P1 downward (pulse down).

In a state in which a minimum load is increased from the normal load state (a state in which an increment of the load is minimum), the detection signal VRs generated in the area a is detected in the first section T1. The detection signal VRs generated in the area b is detected in the first section T1 and the second section T2. A detection signal generated in the area c is detected in the second section T2 and the third section T3. In the example in FIG. 4, a pattern (0, 1, 1) is detected as a pattern representing a rotation state. The control circuit 103 determines that there is rotation with reserved capacity in the same manner as in the case of the normal load described above, and executes pulse control so as to move a rank of the drive energy of the main drive pulse P1 downward.

In a state of a middle load increment (rotation without reserved capacity), a pattern (1, 1, 1) is detected as a pattern representing the rotation state. The control circuit 103 maintains the rank of the main drive pulse P1.

In a state of a large load increment (rotation with least energy), a pattern (1, 0, 1) is detected as a pattern representing the rotation state. The control circuit 103 moves the rank of the main drive pulse P1 upward (pulse up).

In a non-rotation state, a pattern (0, 0, 0) is detected as a pattern representing the rotation state. The rotor of the stepping motor 105 does not rotate by driving only with the main drive pulse P1. The control circuit 103 performs driving with the corrective drive pulse P2 and performs pulse-up of the main drive pulse P1.

Figures 5, 6:
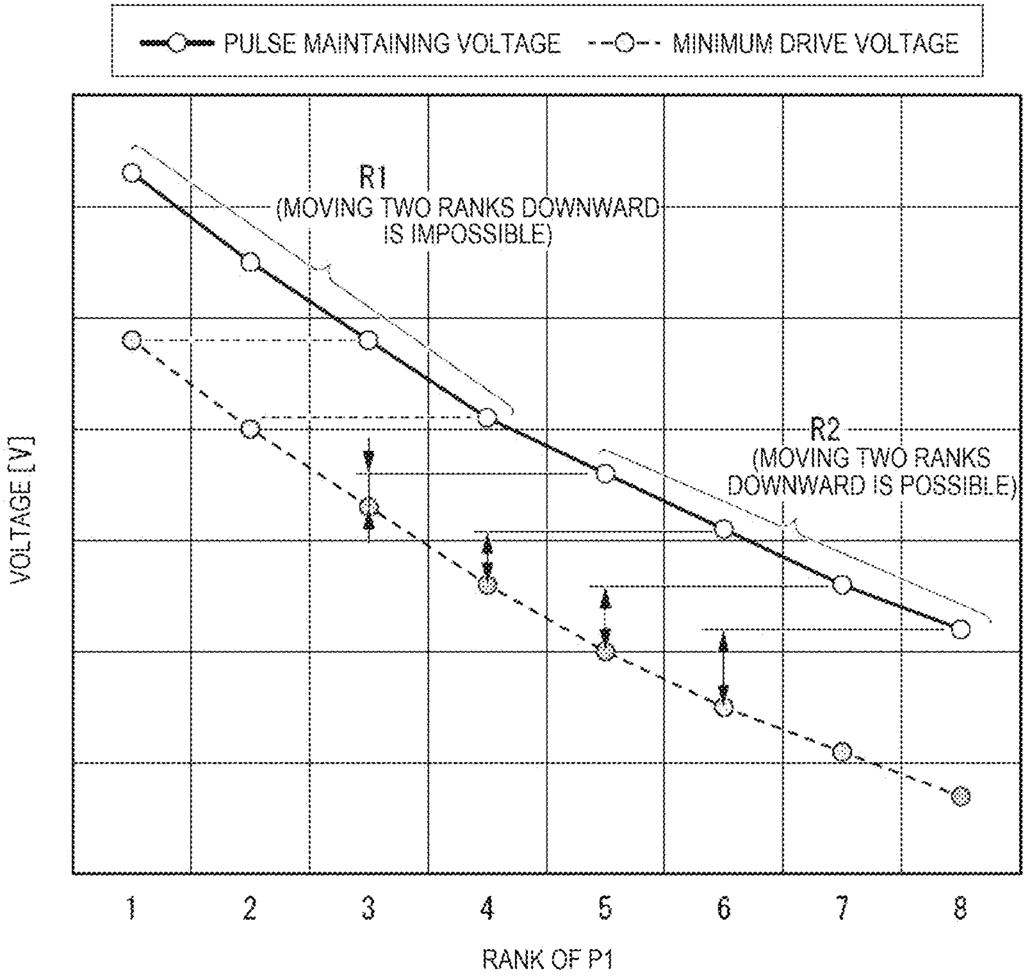
FIG. 5 is a determination chart summarizing an example of the operation of the stepping motor control circuit according to the embodiment of the invention.
FIG. 6 is a diagram showing an example of a relationship among a rank of a main drive pulse, a rank maintaining voltage, and a minimum drive voltage according to the embodiment of the invention.

FIG. 5 is a determination chart summarizing an example of the operation of the stepping motor control circuit according to the present embodiment. As shown in FIG. 5, when the detection signal VRs exceeding the reference threshold voltage Vcomp is detected only in the second section T2 or only in the second section T2 and the third section T3 (when the pattern indicating the rotation state is a pattern (0, 1, 1/0)), it is determined that rotation is rotation with reserved capacity in which the drive energy has a reserved capacity, and the rank of the main drive pulse P1 is moved downward. The determination value "1/0" means that the determination value may be either "1" or "0".

When the detection signal VRs exceeding the reference threshold voltage Vcomp is detected in all the first section T1 to the third section T3 or in only the first section T1 and the second section T2 (at least the first section T1 and the second section T2) (when a pattern representing the rotation state is a pattern (1, 1, 1/0)), it is determined that rotation is rotation without reserved capacity in which there is no room for moving the rank of the drive energy downward, and a current state is maintained without changing the energy of the main drive pulse P1.

When the detection signal VRs exceeding the reference threshold voltage Vcomp is detected only in the first section T1 and the third section T3, or is detected only in the third section T3 (when a pattern indicating the rotation state is a pattern (1/0, 0, 1)), it is determined that rotation is rotation with least energy in which the drive energy has a least amount, and the rank of the main drive pulse P1 is moved upward without driving with the corrective drive pulse P2.

When the detection signal VRs exceeding the reference threshold voltage Vcomp is detected only in the first section T1, or when no detection signal VRs is detected in any of the first section T1 to the third section T3 (when a pattern indicating the rotation state is a pattern (1/0, 0, 0)), it is determined that the rotation is non-rotation, and after driving with the corrective drive pulse P2, the rank of the main drive pulse P1 is moved upward.

Here, attention is paid to a rank maintaining voltage and a minimum drive voltage. The rank maintaining voltage is a voltage at which a pulse operation is maintained in FIG. 4. The minimum drive voltage is a voltage immediately before the rotor of the stepping motor 105 becomes non-rotation with the main drive pulse P1.

FIG. 6 is a diagram showing an example of a relationship among the rank of the main drive pulse P1, the rank maintaining voltage, and the minimum drive voltage according to the present embodiment.

The higher the rank of the main drive pulse P1, the lower the rank maintaining voltage and the minimum drive voltage. When the rank of the main drive pulse P1 increases to a predetermined rank, the main drive pulse P1 acts even after the magnetic pole of the rotor 202 passes through the inner notch provided in the stator 201. While the main drive pulse P1 is applied even after the magnetic pole of the rotor 202 passes through the inner notch, the magnetic pole of the rotor 202 is attracted to an end of the second quadrant. Further, even when the rank becomes higher, the rank maintaining voltage is less likely to decrease. That is, as the energy of the main drive pulse P1 increases, a voltage difference between the rank maintaining voltage and the minimum drive voltage tends to increase. In accordance with this tendency, there is an area of the rank of the main drive pulse P1 where the main drive pulse P1 does not cause non-rotation even when two ranks are moved downward at one time at the time of the rank down. The area is also referred to as an area in which moving two ranks downward is possible. An area in which the non-rotation is caused by the main drive pulse P1 when moving two ranks downward at one time at the time of the rank down is also referred to as an area in which moving two ranks downward is impossible.

As described above, the inner notch in the stator 201 is the cutout portion 205 constituting the position determination portion for determining a stop position of the rotor 202. A position of the inner notch in the stator 201 corresponds to a point at which a magnetic potential of the stator 201 is maximized. The energy of the main drive pulse, which continues to act after the magnetic pole of the rotor 202 passes the point where the magnetic potential of the stator 201 is maximized and acts to attract the rotor 202 to the end of the second quadrant, is an example of a predetermined first energy.

As described below, in the present embodiment, the rank of the main drive pulse P1 is selected using the above-described tendency that the voltage difference between the rank maintaining voltage and the minimum drive voltage increases as the energy of the main drive pulse P1 becomes higher.

The number of selectable ranks of the main drive pulse P1 depends on a specification of the control circuit 103 and is determined in advance. In the example of the present embodiment, the number of selectable ranks of the main drive pulse P1 is four.

An area R2 shown in FIG. 6 is an example of the area in which moving two ranks downward is possible. The area R2 is an area with ranks "5", "6", "7", and "8". On the other hand, an area R1 is an example of the area in which moving two ranks downward is impossible. The area R1 is an area with ranks "1", "2", "3", and "4".

In the present embodiment, the control circuit 103 selects a rank of the main drive pulse P1 such that an energy difference between ranks of the main drive pulses P1 in the main drive pulses P1 having a predetermined energy E1 or more is larger than an energy difference between ranks of the main drive pulses P1 having an energy less than the energy E1. In the present embodiment, the energy E1 is an energy corresponding to a boundary between the area in which moving two ranks downward is possible and the area in which moving two ranks downward is impossible. In the example in FIG. 6, the energy E1 is an energy corresponding to between a rank "4" and a rank "5". The energy E1 is an example of the predetermined first energy.

In the area R2 where a voltage difference between the rank maintaining voltage and the minimum drive voltage is large, the rank of the main drive pulse P1 is selected by skipping one rank. Specifically, the area R2 is an area with the rank of the main drive pulse P1 in which a voltage difference can be expected between a rank maintaining voltage for a rank of a certain main drive pulse P1 and a minimum drive voltage two ranks below that rank. In an area where the voltage difference between the rank maintaining voltage and the minimum drive voltage becomes large, to select the rank of the main drive pulse P1 by skipping one rank means, in the example in FIG. 6, to select the rank of the main drive pulse P1 from among ranks "2", "3", "5", and "7".

In the following description, to rank up means to change to a rank with the next highest energy from a current rank among selectable ranks. When the current rank is a rank with energy less than energy E1 and a rank with the next highest energy from the current rank is a rank with the energy E1 or more, to rank up means to move two ranks upward. When the current rank is a rank with the energy E1 or more, to rank up also means to move two ranks upward. On the other hand, when a rank with the next highest energy from the current rank is a rank with less than the energy E1, to rank up means to move one rank upward.

Similarly, to rank down means to change to a rank with the next lowest energy from the current rank among selectable ranks. When the current rank is a rank with the energy E1 or more, to rank down means to move two ranks downward. When the current rank is a rank with less than the energy E1, to rank down means to move one rank downward.

In the control circuit 103 according to the present embodiment, the range of energy that can be supplied can be enlarged compared with the related art without increasing the number of ranks of the main drive pulse P1.

As described above, the control circuit 103 selects a plurality of main drive pulses P1 such that a difference in energy between a plurality of main drive pulses P1 in the main drive pulses P1 having the predetermined energy E1 or more is larger than a difference in energy between a plurality of main drive pulses P1 in the main drive pulses P1 having an energy less than the energy E1.

In the example of the present embodiment, a difference in energy between the plurality of main drive pulses P1 in the main drive pulses P1 having an energy less than the energy E1 is a difference in energy with one rank. A difference in energy between the plurality of main drive pulses P1 in the main drive pulses P1 having the energy E1 or more is a difference in energy with two ranks.

The difference in energy between the plurality of main drive pulses P1 is not limited to the example described above as long as a difference in energy between the plurality of main drive pulses P1 in the main drive pulses P1 having the energy E1 or more is larger than a difference in energy between the plurality of main drive pulses P1 in the main drive pulses P1 having an energy less than the energy E1. For example, when a difference in energy between a plurality of main drive pulses P1 in the main drive pulses P1 having an energy less than the energy E1 is a difference in energy with one rank, a difference in energy between a plurality of main drive pulses P1 in the main drive pulses P1 having the energy E1 or more may be a difference in energy with three ranks or three ranks or more.

As described above, the area in which moving two ranks downward is possible is determined based on the voltage difference between the rank maintaining voltage and the minimum drive voltage. The area in which moving two ranks downward is possible shown in FIG. 6 is an example, and is not limited thereto. A range of the selectable ranks shown in FIG. 6 is an example, and the invention is not limited thereto. The range of the area in which moving two ranks downward is possible and the selectable rank can be changed from the example shown in FIG. 6 depending on specifications of at least one of the stepping motor control circuit and the analog electronic timepiece.

Figure 7:
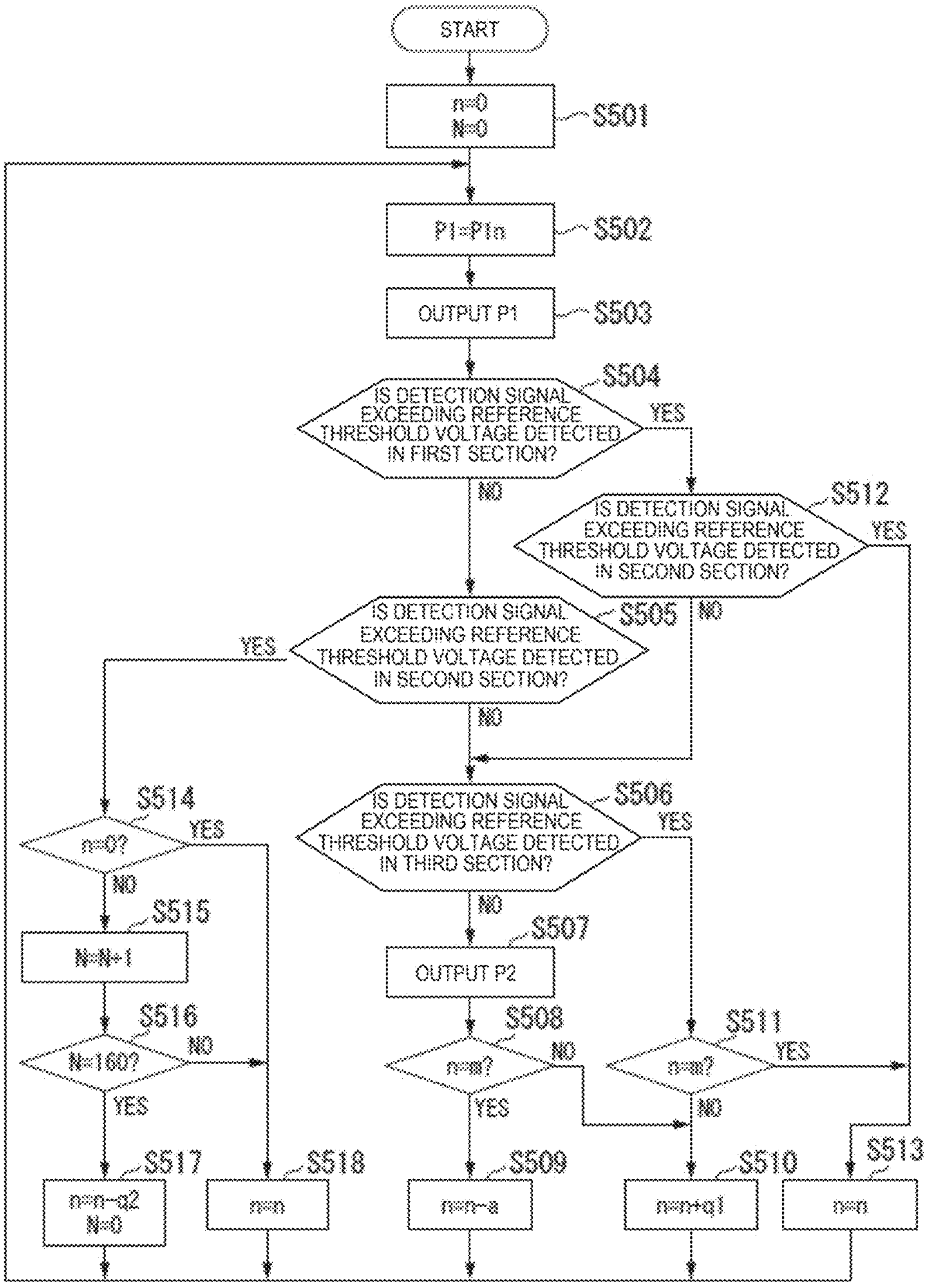
FIG. 7 is a flowchart showing an example of operations of the stepping motor control circuit and the analog electronic timepiece according to the embodiment of the invention.

FIG. 7 is a flowchart showing an example of operations of the stepping motor control circuit and the analog electronic timepiece according to the present embodiment. The operations of the stepping motor control circuit and the analog electronic timepiece are mainly processing executed by the control circuit 103.

The oscillation circuit 101 generates a reference clock signal having a predetermined frequency. The frequency dividing circuit 102 divides a frequency of the reference clock signal generated by the oscillation circuit 101 and generates a timepiece signal that serves as a reference for timekeeping. The frequency dividing circuit 102 outputs the generated timepiece signal to the control circuit 103.

The control circuit 103 counts the timepiece signal output from the frequency dividing circuit 102 and performs a clocking operation. First, the control circuit 103 sets a rank n and the number of times N of the main drive pulse P1*n* to 0 (step S501). The control circuit 103 generates a control signal so as to rotationally drive the stepping motor 105 with the main drive pulse P10 having a minimum pulse width (step S502). The control circuit 103 outputs the generated control signal to the drive pulse selection circuit 104 (S503).

The drive pulse selection circuit 104 rotationally drives the stepping motor 105 with the main drive pulse P10 in response to the control signal from the control circuit 103. The stepping motor 105 is rotationally driven with the main drive pulse P10 to rotationally drive the hour hand 107, the minute hand 108, and the second hand 109. Accordingly, when the stepping motor 105 rotates normally, the analog display unit 106 displays a current time at any time with the hour hand 107, the minute hand 108, and the second hand 109.

The control circuit 103 determines whether the detection signal VRs exceeding the reference threshold voltage Vcomp is detected in the first section T1 (step S504). Here, the control circuit 103 first determines whether the detection signal VRs exceeding the predetermined reference threshold voltage Vcomp is detected based on a detection result of the detection signal VRs of the stepping motor 105 by the rotation detection circuit 110. If it is determined that the detection signal VRs is detected, the control circuit 103 determines whether a detection time t is within the first section T1 based on a determination result of the detection time t at which the detection signal VRs is detected by the detection section determination circuit 111.

If it is determined that the detection signal VRs exceeding the reference threshold voltage Vcomp is not detected in the first section T1 (NO in step S504), the control circuit 103 executes processing in step S505. On the other hand, if it is determined that the detection signal VRs exceeding the reference threshold voltage Vcomp is detected in the first section T1 (YES in step S504), the control circuit 103 executes processing in step S512.

The control circuit 103 determines whether the detection signal VRs exceeding the reference threshold voltage Vcomp is detected in the second section T2 (step S505). The control circuit 103 performs the determination in the same manner as the determination in step S504.

If it is determined that the detection signal VRs exceeding the reference threshold voltage Vcomp is not detected in the second section T2 (NO in step S505), the control circuit 103 executes processing in step S506. On the other hand, if it is determined that the detection signal VRs exceeding the reference threshold voltage Vcomp is detected in the second section T2 (YES in step S505), the control circuit 103 executes processing in step S514.

The control circuit 103 determines whether the detection signal VRs exceeding the reference threshold voltage Vcomp is detected in the third section T3 (step S506). The control circuit 103 performs the determination in the same manner as the determination in step S504.

If it is determined that the detection signal VRs exceeding the reference threshold voltage Vcomp is not detected in the third section T3 (NO in step S506), the control circuit 103 executes processing in step S507. On the other hand, if it is determined that the detection signal VRs exceeding the reference threshold voltage Vcomp is detected in the third section T3 (YES in step S506), the control circuit 103 executes processing in step S511.

In step S506, if it is determined that the detection signal VRs exceeding the reference threshold voltage Vcomp is not detected in the third section T3 (non-rotation with the pattern (0, 0, 0)), the control circuit 103 drives the stepping motor 105 with the corrective drive pulse P2 (step S507). Thereafter, the control circuit 103 determines whether the rank n of the main drive pulse P1 is the highest rank m (step S508).

If it is determined that the rank n of the main drive pulse P1 is not the highest rank m (NO in step S508), the control circuit 103 moves the main drive pulse P1 one rank upward and changes the main drive pulse P1 to a main drive pulse P1(*n*+*q*1)(S510; (b3) in FIG. 3). Here, q1 is an integer having a value of 1 or 2 according to a selectable rank as a rank with the next highest energy from the rank n. In next drive, the control circuit 103 performs driving with the main drive pulse P1(*n*+*q*1).

On the other hand, if it is determined that the rank n of the main drive pulse P1 is the highest rank m (YES in step S508), the control circuit 103 changes the main drive pulse P1 to a main drive pulse P1(*n*-*a*) having a predetermined small amount of energy (step S509). In next drive, the control circuit 103 performs driving with the main drive pulse P1(*n*-*a*). At this time, in order to obtain a large power saving effect, the main drive pulse may be changed to the main drive pulse P10 having the minimum energy.

In step S506, if it is determined that the detection signal VRs exceeding the reference threshold voltage Vcomp is detected in the third section T3 (rotation with least energy with the pattern (0, 0, 1)), the control circuit 103 determines whether the rank n of the main drive pulse P1 is the highest rank m (step S511).

If it is determined that the rank n of the main drive pulse P1 is not the highest rank m (NO in step S511), the control circuit 103 moves the main drive pulse P1 one rank upward and changes the main drive pulse P1 to a main drive pulse P1(*n*+*q*1)(S510; (b2) in FIG. 3). Here, q1 is an integer having a value of 1 or 2 according to a selectable rank as a rank with the next highest energy from the rank n. In next drive, the control circuit 103 performs driving with the main drive pulse P1(*n*+*q*1).

On the other hand, if the control circuit 103 determines in step S511 that the rank n of the main drive pulse P1 is the highest rank m, the rank cannot be changed, so that the main drive pulse P1 is not changed (step S513). In next drive, the control circuit 103 performs driving with the main drive pulse P1.

In step S504, if it is determined that the detection signal VRs exceeding the reference threshold voltage Vcomp is detected in the first section T1, the control circuit 103 determines whether the detection signal VRs exceeding the reference threshold voltage Vcomp is detected in the second section T2 (step S512). The control circuit 103 performs the determination in the same manner as the determination in step S504.

If it is determined that the detection signal VRs exceeding the reference threshold voltage Vcomp is not detected in the second section T2 (NO in step S512), the control circuit 103 executes processing in step S506. Thereafter, as the control circuit 103 executes the above-described processing, either operation in (b1) or (b4) in FIG. 3 is performed.

On the other hand, if it is determined that the detection signal VRs exceeding the reference threshold voltage Vcomp is detected in the second section T2 (YES in step S512), the control circuit 103 executes processing in step S513.

In step S512, if it is determined that the detection signal VRs exceeding the reference threshold voltage Vcomp is detected in the second section T2 (rotation without reserved capacity with the pattern (1, 1, 1/0)), the control circuit 103 does not change the main drive pulse P1(step S513). In next drive, the control circuit 103 performs driving with the main drive pulse P1 ((a1) and (a2) in FIG. 3).

On the other hand, in step S505, if it is determined that the detection signal VRs exceeding the reference threshold voltage Vcomp is detected in the second section T2 (rotation with reserved capacity with the pattern (0, 1, 1/0)), the control circuit 103 determines whether the rank n of the main drive pulse P1 is the lowest rank 0 (step S514).

If the control circuit 103 determines that the rank n of the main drive pulse P1 is the lowest rank 0 (YES in step S514), the rank cannot be changed, so that the main drive pulse P1 is not changed (step S518). The control circuit 103 performs next driving with the main drive pulse P1.

On the other hand, if it is determined that the rank n of the main drive pulse P1 is not the lowest rank 0 (NO in step S514), the control circuit 103 adds 1 to the number of times N (step S515). Thereafter, the control circuit 103 determines whether the number of times N reaches a predetermined number (160 as an example) (step S516).

If it is determined that the number of times N reaches the predetermined number (YES in step S516), the control circuit 103 moves the main drive pulse P1 one rank downward and changes the main drive pulse P1 to a main drive pulse P1(*n*−*q*2), and resets the number of times N to 0 (step S517). Here, q2 is an integer having a value of 1 or 2 according to a selectable rank as a rank with the next lowest energy from the rank n. Thereafter, the control circuit 103 executes the processing in step S502 again ((c1) and (c2) in FIG. 3). That is, when the processing from step S504 to step S505, step S514, and step S515 are consecutively executed a predetermined number of times, the main drive pulse P1 is moved downward by one rank.

On the other hand, if it is determined that the number of times N does not reach the predetermined number (NO in step S516), the control circuit 103 does not change the rank (step S518).

The operations of the stepping motor control circuit and the analog electronic timepiece have been described above.

Figure 8:
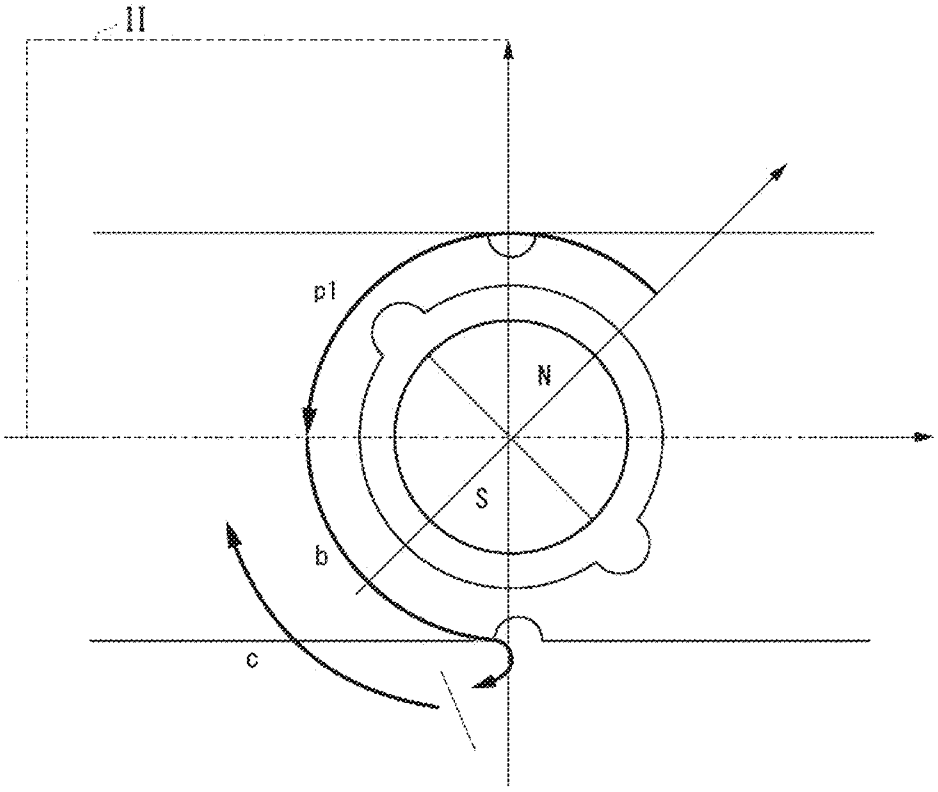
FIG. 8 is a diagram showing an example of a second quadrant according to the embodiment of the invention.

In the present embodiment, an example is described in which the predetermined first energy is the energy E1, but the invention is not limited thereto. The predetermined first energy may be the energy of the main drive pulse, which continues to act after the magnetic pole of the rotor 202 passes the point where the magnetic potential of the stator is maximized and acts to attract the rotor 202 to the end of the second quadrant II. As described above, the second quadrant II is a quadrant (area) in which X is a negative value and Y is a positive value when the XY coordinate space centered on the rotation axis of the rotor 202 is divided into four quadrants. FIG. 8 shows the second quadrant II. In FIG. 8, a rotation behavior of the rotor 202 is an example.

There is a one-to-one correspondence between the energy of the main drive pulse, which continues to act after the magnetic pole of the rotor 202 passes the point where the magnetic potential of the stator is maximized and acts to attract the rotor 202 to the end of the second quadrant II, and the energy of a rank in the above-mentioned area in which moving two ranks downward is possible. Therefore, the main drive pulse P1, with the energy of the main drive pulse, which continues to act after the magnetic pole of the rotor 202 passes the point where the magnetic potential of the stator is maximized and acts to attract the rotor 202 to the end of the second quadrant II, can be moved downward by two ranks.

As another example, the predetermined first energy may be energy at which the main drive pulse P1 having the first energy or more has a total length of 3.5 ms or more and 5.0 ms or less. That is, the control circuit 103 may select a plurality of main drive pulses P1 such that a difference in energy between a plurality of main drive pulses P1 in the main drive pulses P1 having the total length of 3.5 ms or more and 5.0 ms or less is larger than a difference in energy between a plurality of main drive pulses P1 in the main drive pulses P1 having a total length of less than 3.5 ms.

The main drive pulse P1 having a total length of 3.5 ms or more and 5.0 ms or less may continue to act after the magnetic pole of the rotor 202 passes the point where the magnetic potential of the stator is maximized, and act to attract the rotor 202 to the end of the second quadrant II. Therefore, for the main drive pulse P1 having a total length of 3.5 ms or more and 5.0 ms or less, the control circuit 103 can perform two ranks down.

On the other hand, the main drive pulse P1 having a total length exceeding 5.0 ms holds the magnetic pole of the rotor 202 at the end of the second quadrant II, making it difficult to generate a rotation detection signal Vrs. Therefore, when the main drive pulse P1 whose total length exceeds 5.0 ms is used, it is considered that it becomes difficult to detect a rotation state of the stepping motor 105 based on the rotation detection signal Vrs.

In the present embodiment, an example is described in which the rank is moved downward when the rotation is continuously performed a predetermined number of times (N times), but the invention is not limited thereto. When the detection signal VRs exceeding the reference threshold voltage Vcomp is detected once in the second section T2 in step S505 of the processing shown in FIG. 7, if the main drive pulse P1 at that time is not the lowest rank 0, the main drive pulse P1 may be moved downward by one rank. According to this configuration, since it is not necessary to set the number of times N, in step S501, the rank n may be initially set to the lowest rank 0 without performing initial setting of the number of times. Since it is not necessary to count the number of times N, the configuration is simpler than that of the present embodiment.

In the present embodiment, an example is described in which the main drive pulse P1 is changed to the main drive pulse P1 having a small energy when the main drive pulse P1 has the maximum energy, but the invention is not limited thereto. When the main drive pulse P1 driven in step S508 of the processing shown in FIG. 7 has the maximum energy after being driven with the corrective drive pulse P2, step S518 may be executed and the main drive pulse P1 may not be changed.

According to this configuration, as in a case where a load of the motor is restored to a normal state by driving with the corrective drive pulse P2, for example, in a case where the rotationally driving can be performed again with the main drive pulse P1, next drive is rotationally driving with the main drive pulse P1*m* having a maximum energy. Therefore, it becomes possible to more reliably perform rotationally driving with the main drive pulse P1. Therefore, when the normal state is restored, it is highly possible to avoid driving with the corrective drive pulse P2, making it possible to save energy.

In the present embodiment, an example is described in which the detection section is divided into three sections (the first section T1, the second section T2, and the third section T3), but the invention is not limited thereto. The detection section may be divided into four sections, or five or more sections. Therefore, the control circuit 103 divides the detection section that starts immediately after the drive with the main drive pulse P1 into a plurality of sections, which are three or more sections, and controls the main drive pulse P1 according to a section in which the rotation detection circuit 110 detects a detection signal exceeding the reference threshold voltage Vcomp. When the detection section is divided into four or more sections, a rotation state of the stepping motor can be detected more accurately than in a case of being divided into three sections.

As described above, the stepping motor control circuit according to the present embodiment includes the rotation detection unit (the rotation detection circuit 110 in the present embodiment) and the control unit (the control circuit 103, the drive pulse selection circuit 104, and the detection section determination circuit 111 in the present embodiment).

The rotation detection unit (the rotation detection circuit 110 in the present embodiment) detects, in a detection section in which the detection signal VRs generated by rotation of the stepping motor 105 is detected, a rotation state of the stepping motor 105 based on whether the detection signal VRs exceeds a predetermined reference threshold voltage in a predetermined detection section (one or more of the first section T1, the second section T2, and the third section T3 in the present embodiment).

The control unit (the control circuit 103, the drive pulse selection circuit 104, and the detection section determination circuit 111 in the present embodiment) drives and controls the stepping motor 105 with any one of the plurality of main drive pulses P1 having different energies according to the detection result obtained by the rotation detection unit (the rotation detection circuit 110 in the present embodiment).

The control unit (in the present embodiment, the control circuit 103, the drive pulse selection circuit 104, and the detection section determination circuit 111) selects a plurality of main drive pulses P1 such that a difference in energy between a plurality of main drive pulses P1(main drive pulses with the ranks "5" and "7" in the present embodiment) in the main drive pulses P1 having a predetermined first energy (the energy E1 in the present embodiment) or more is larger than a difference in energy between a plurality of main drive pulses P1(main drive pulses with the ranks "2" and "3" in the present embodiment) in the main drive pulses P1 having an energy less than the first energy (the energy E1 in the present embodiment).

With this configuration, in the stepping motor control circuit according to the present embodiment, a range of energies that can be supplied can be expanded compared with the related art without increasing the number of ranks of the main drive pulse P1, so that a drive range can be expanded even when there is a limit to the number of selectable ranks of the main drive pulse.

In the present embodiment, the pulse width is made different in order to change the energy of each main drive pulse P1, but it is also possible to change the drive energy by changing a pulse voltage, or the like. The main drive pulse P1 may be configured to have a comb-tooth chopping waveform, and the drive energy of the main drive pulse P1 may be changed by changing the number of choppings or a duty ratio.

The stepping motor control circuit according to the present embodiment can be applied to a stepping motor for driving a calendar or the like of an analog electronic timepiece with various calendar functions, in addition to the time hands.

Although an electronic timepiece has been used as an example of an application of a stepping motor, the invention can be applied to an electronic device that uses a motor.

Although the embodiment of the invention has been described in detail with reference to the drawings, specific configurations are not limited to those described above, and various design changes and the like can be made without departing from the gist of the invention.

What is claimed is:

1. A stepping motor control circuit comprising:

a rotation detector configured to detect rotation of a stepping motor driven by a drive pulse, wherein the rotation detector is configured to detect a peak signal generated within a detection interval by a free oscillation of the stepping motor, wherein the detection interval comprises subset-intervals extensive in series within the detection interval;

a peak signal location detector configured to relate the detected peak signal to one of the subset-intervals in which the peak signal is detected by the rotation detector; and a drive pulse selector configured to select one of energy ranks of the drive pulse to be applied to the stepping motor, wherein the energy ranks represent different energy levels of the drive pulse, and the drive pulse selector configured to execute a rank-up or a rank-down of the energy ranks according to a combination of detection and/or non-detection of the peak signal in the respective subset-intervals, and further wherein the energy ranks are set to distribute along higher and lower sides of a reference energy level, and a change of energy level of the drive pulse caused by a single execution of the rank-up or the rank-down on a higher side of the reference energy level is larger than a change of energy level of the drive pulse caused by a single execution of the rank-up or the rank-down on a lower side of the reference energy level.

2. The stepping motor control circuit according to claim 1, wherein the stepping motor comprises a stator and a rotor magnetized to have magnetic poles, and the drive pulse having the reference energy level continues to be applied to the stepping motor after one of the magnetic poles of the rotor passes a point where a magnetic potential of the stator is maximized, so as to keep attracting the rotor to an end of a second quadrant.

3. The stepping motor control circuit according to claim 1, wherein the drive pulse having the reference energy level or more has a pulse length of 3.5 ms or more and 5.0 ms or less.

4. The stepping motor control circuit according to claim 1, wherein the drive pulse selector is configured to execute the rank-down when a combination of the detection and/or the non-detection of the peak signal in the respective subset-intervals indicates that the stepping motor rotates by application of the drive pulse at an energy level more than sufficient for the stepping motor to rotate.

5. The stepping motor control circuit according to claim 1, wherein the detection interval starts immediately after the drive pulse starts to be applied to the stepping motor, the subset-intervals count three or more, and the rotation detector detects the peak signal exceeding a reference threshold voltage.

6. An analog electronic timepiece comprising a stepping motor configured to rotationally drive a time hand and the stepping motor control circuit according to claim 1.

* * * * *